(12) United States Patent
Soulier

(10) Patent No.: US 10,091,030 B2
(45) Date of Patent: Oct. 2, 2018

(54) BLIND CHANNEL EQUALISER

(71) Applicants: CONTINENTAL AUTOMOTIVE FRANCE, Toulouse (FR);
CONTINENTAL AUTOMOTIVE GmbH, Hannover (DE)

(72) Inventor: Gerald Soulier, Rambouillet (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/536,822

(22) PCT Filed: Dec. 16, 2015

(86) PCT No.: PCT/EP2015/002532
§ 371 (c)(1),
(2) Date: Jun. 16, 2017

(87) PCT Pub. No.: WO2016/096130
PCT Pub. Date: Jun. 23, 2016

(65) Prior Publication Data
US 2017/0359202 A1    Dec. 14, 2017

(30) Foreign Application Priority Data

Dec. 18, 2014 (FR) .................................... 14 62711

(51) Int. Cl.
*H04L 25/03* (2006.01)

(52) U.S. Cl.
CPC .... *H04L 25/0305* (2013.01); *H04L 25/03184* (2013.01); *H04L 2025/0363* (2013.01); *H04L 2025/03401* (2013.01); *H04L 2025/03477* (2013.01); *H04L 2025/03675* (2013.01); *H04L 2025/03687* (2013.01)

(58) Field of Classification Search
CPC .................. H04L 2025/03675; H04L 25/0305
See application file for complete search history.

(56) References Cited

PUBLICATIONS

Zhi-Hou Lee et al., "Energy Normalized Cross-Correlation Constant Modulus Algorithm in a MIMO Convolutive System", ICSP2010 Proceedings, Signal Processing (ICSP), Oct. 24, 2010, pp. 1445-1448.

(Continued)

*Primary Examiner* — Ross Varndell
(74) *Attorney, Agent, or Firm* — Young & Thompson

(57) ABSTRACT

A blind channel equalizer device for a radiofrequency receiver suitable for modulating the constant envelope signal of the transmission includes: an adjustable linear digital filter, defined at a point in time by the coefficients) thereof, able to filter an input signal in order to produce an output signal; an estimator able to estimate a power of the input signal; an adapter able to adapt the filter by calculating the coefficients of the filter at a point in time by subtracting, from the filter coefficients at a preceding point in time, the gradient of a cost function assigned with a correction coefficient. The cost function includes a first distance criterion between the square of the output signal and the power, wherein the correction coefficient is a product including a constant convergence coefficient and a scaling coefficient inversely proportional to the square of the power. Also disclosed is a related Radiofrequency receiver.

20 Claims, 3 Drawing Sheets

(56) References Cited

PUBLICATIONS

Figure 1:
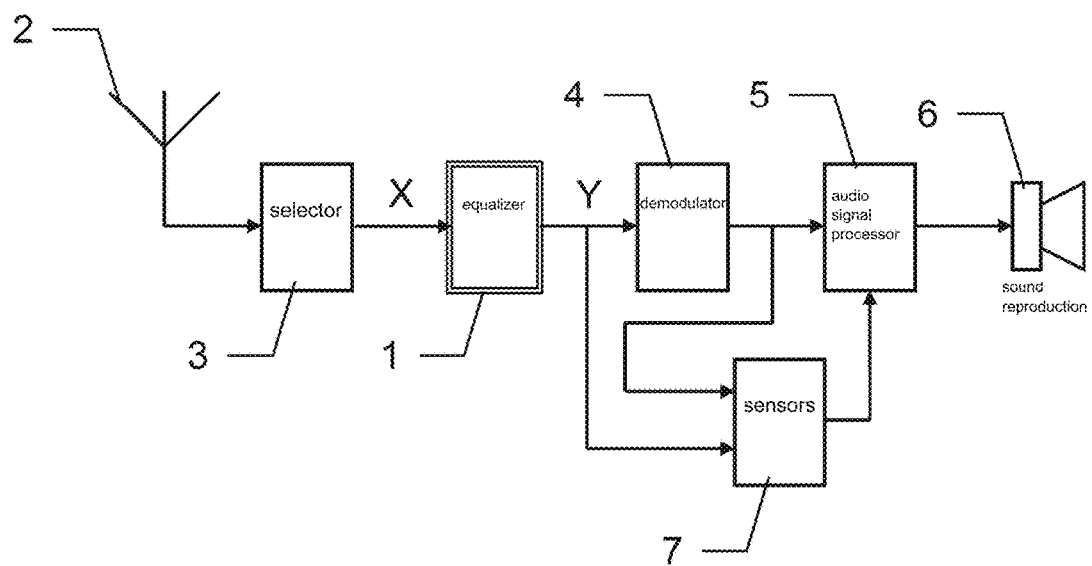

Axford et al., "The Transversal and Lattice Multiple Modulus Algorithms for Blind Equalization of QAM Signals", Proceedings of the Military Communications Conference (MILCOM), Nov. 6, 1995. pp. 586-591.

Bellanger, "On the Performance of Two Constant Modules Algorithms in Equalization with non-CM Signals", Circuits and System, May 1, 2007, pp. 3475-3478.

International Search Report, dated Mar. 9, 2016, from corresponding PCT application No. PCT/EP2015/002532.

|    | B(i-1)   | bi       | α       | β      | δ   | η  | α'         | β'       |
|----|----------|----------|---------|--------|-----|----|------------|----------|
| Z1 | 4,77E-07 | 1,91E-06 | -655360 | 1,3125 | -28 | 11 | -1342177280 | 2688     |
| Z2 | 1,91E-06 | 7,63E-06 | -163840 | 1,3125 | -24 | 13 | -1342177280 | 10752    |
| Z3 | 7,63E-06 | 3,05E-05 | -40960  | 1,3125 | -20 | 15 | -1342177280 | 43008    |
| Z4 | 3,05E-05 | 0,000122 | -10240  | 1,3125 | -16 | 17 | -1342177280 | 172032   |
| Z5 | 0,000122 | 0,000488 | -2560   | 1,3125 | -12 | 19 | -1342177280 | 688128   |
| Z6 | 0,000488 | 0,001953 | -640    | 1,3125 | -8  | 21 | -1342177280 | 2752512  |
| Z7 | 0,001953 | 0,007813 | -160    | 1,3125 | -4  | 23 | -1342177280 | 11010048 |
| Z8 | 0,007813 | 0,03125  | -40     | 1,3125 | 0   | 25 | -1342177280 | 44040192 |

BLIND CHANNEL EQUALISER

The present invention relates to the technical field of the radiofrequency transmission and, more particularly, to blind channel equalization.

In a radiofrequency transmission, a signal M is transmitted between a transmitter and a receiver. The radiofrequency channel over which it is carried, owing notably to the problems caused by the medium where the radio waves are propagating, deforms the transmitted signal M. Accordingly, it is a signal X which is effectively received by the receiver. It is usual to model the signal X by a function H featuring the modifications caused by the channel, applied by convolution to the original signal M, to which a measurement noise B must be added, i.e. X=H(M)+B.

One example of interference is caused by multiple reflections or multi-paths. Subsequent to a reflection on an obstacle, a signal sees its path get longer relative to a signal propagating more directly. It follows from this that a receiver may receive, superposed onto a signal propagated following a shorter path, direct or comprising fewer reflections, one or more occurrences of the same signal, delayed since propagated along longer paths.

The aim of a channel equalizer, furthermore referred to as channel estimator or identifier, is to correct a posteriori the modifications caused by a channel to a signal. For this purpose, an equalizer processes the received input signal X and produces an output signal Y as close as possible to the transmitted signal M. An equalizer is thus a device which applies a corrective function F to the input signal X, in order to produce an output signal Y with Y=F(X)≈M. The quality of an equalizer is better when the output signal Y reproduces the original signal M, as the case may be with a delay T corresponding to the transmission time, such that the quantity $E(|Y(t)-M(t-\tau)|^2)$ is as reduced as possible.

In order to assist with the solution to the problem of equalization, it can be advantageous to include, within the transmitted signal M, known reference elements which, when they are recognized, potentially having been modified, in the received signal X, help the receiver to identify the channel and thus facilitate the determination of the corrective function F. However, it is not always possible or desirable to include such reference elements. An equalizer is said to be blind or self-taught when it does not use such reference elements.

In order to form a blind equalizer, a known solution is to employ an adaptable filter. Such a filter produces the output signal Y starting from the input signal X. The filter is adapted, by closed-loop control, as a function of a cost function J. This cost function J is typically constructed around one or more criteria, indicative of the quantity $E(|Y(t)-M(t-\tau)|^2)$, which it is sought to minimize and/or to zero, even though M is unknown.

The problem of blind equalization has been theorized by GODARD under the name of "constant modulus algorithm", or CMA. One of the results, coming from statistical hypotheses on the transmitted signal M, allows $E(|Y(t)-M(t-\tau)|^2)$ to be replaced by $E((|Y(t)|-r)^2)$, where r is a convergence radius that can be determined or estimated from the input signal X. This provides a means of estimating a criterion for the cost function J.

Other criteria have furthermore been provided in order to implement a blind equalization: SATO, KURTOSIS, BEN-VENISTE.

Another result from GODARD is that this single criterion is not sufficient in that it doesn't guarantee the convergence toward the optimum solution. Accordingly, it needs improvement.

Having a cost function J, by applying a method known as the stochastic gradient method, a known solution is to adapt the filter in a convergent manner.

In practice, the implementation of such a method by means of an adaptable digital filter requires a significant processing power. In the case of an application to an autoradio, installed in an automobile vehicle, an "automotive-hardened" processor should be used (in other words capable of satisfying the conditions imposed by the specifications of the automobile industry), designed to withstand such an environment of use. Such "automotive-hardened" processors conventionally have reduced performance characteristics with respect to the "consumer" processors that may be encountered in applications whose environment imposes fewer constraints: desktop computers, cellular telephones, etc. In any case, an increase in performance for a processor leads to a substantially exponential increase in the cost and it is always advantageous to reduce the requirements in terms of quantity of calculations.

In the current state of technological development, the "automotive-hardened" processors are capable of implementing a basic GODARD method. However, they still remain incapable of implementing a method comprising complements that are nevertheless necessary.

In the framework of an automobile use, owing to the mobility, the channel is modified and significant variations in the power of the received signal are apparent. This variation is likely to cause a divergence of the closed-loop control adapting the filter. A conventional response could be a prior application of a normalization of the power by means of a closed-loop automatic gain control, or AGC. However, such an approach is not desirable in the case of the present use in that it modifies the input signal X, thus interfering with various processing and measurement operations carried out downstream of the equalizer device. This is reinforced in that the equalizer device is optional and that its addition or removal must be transparent for the radiofrequency receiver.

The subject of the present invention aims to overcome these various drawbacks by providing a blind channel equalizer, designed to compensate the power excursion of the input signal X.

For this purpose, the invention provides a blind channel equalizer device for a radiofrequency receiver designed for a modulation with constant envelope signal at transmission, comprising:
 an adaptable linear digital filter, defined at a time by its coefficients, designed to filter an input signal so as to produce an output signal,
 an estimator designed to estimate a power of the input signal,
 an adaptor designed to adapt the filter by calculating the coefficients of the filter at a given time, by subtracting from the coefficients of the filter at a preceding time the gradient of a cost function to which a correction coefficient is assigned,
 where the cost function comprises a first distance criterion between the square of the output signal and the power,
 where the correction coefficient is a product comprising a constant convergence coefficient, and a scaling coefficient inversely proportional to the square of the power.

Such a feature advantageously allows the correction coefficient of the stochastic gradient to be adapted in order to take the power effectively received into account for the input signal. It additionally allows the employment of an automatic gain closed-loop control, detrimental to the other modules disposed downstream, to be avoided.

According to another feature, the cost function is defined by the formula $J=(|y(n)|^2-P)^2$, with J the cost function, $y(n)$ the sample of the output signal at the time n, and P the power.

According to another feature, the device furthermore comprises a dispersion means, replacing the gradient of the cost function, defined by the formula $\nabla J=(|y(n)|^2-P)y(n)\overline{X(n)}$, with $\nabla$ the gradient operator, J the cost function, $y(n)$ the sample of the output signal at the time n, P the power, $X(n)$ the vector of the samples $x(k)$ of the input signal, $k\in\{n-K,\ldots,n\}$, K being the dimension of the filter, and $\overline{z}$ denoting the conjugate of a complex number z, by the formula $\nabla J=(|y(n)|^2-P)y(n+q)\overline{X(n)}$, with q a random integer, such that $-Q<q<+Q$, with Q an integer preferably equal to 10.

According to another feature, the cost function furthermore comprises a second criterion for equivalence to zero of the projection onto the real axis of the product of the output signal and of its derivative, the cost function then being defined by the formula $J=(|y(n)|^2-P)^2+(Re(\overline{y(n)}(y(n)-y(n-1))))^2$, with J the cost function, $y(n)$, respectively $y(n-1)$, the sample of the output signal at the time n, respectively at the preceding time n−1, P the power, Re(z) denoting the real part of a complex number z and $\overline{z}$ denoting the conjugate of a complex number z.

According to another feature, the filter is a filter with finite pulse response, RIF.

According to another feature, the device furthermore comprises a controller, designed to verify, following a calculation of the coefficients of the filter, that each coefficient is included between a minimum threshold and a maximum threshold, preferably with each minimum threshold equal to the opposite of the corresponding maximum threshold, and the said controller being furthermore designed to reset the coefficients of the filter in the opposite case.

According to another feature, the device furthermore comprises an approximator designed to determine an approximation of the scaling coefficient, comprising a division means designed to divide the range of power of the input signal into a plurality of regions, such that the power varies substantially by a factor 4 between two contiguous regions, an association means designed to associate with each region an approximating function for calculation of the scaling coefficient over the said region as a function of the power, in the form of a polynomial divided by a power of 2 quadruple of an index corresponding to the region, in continuity with the approximating function associated with a contiguous region, and an application means designed to apply the approximating function associated with a corresponding region to the power in order to calculate an approximation of the scaling coefficient.

According to another feature, a polynomial of an approximating function is a linear function of the power.

According to another feature, the estimator determines the power of the input signal, by an average over a sliding time window, being assigned a configurable fixed gain.

The invention furthermore relates to a radiofrequency receiver comprising such a channel equalizer device.

The invention thus provides a number of novel features, which may be implemented alone or in a complementary manner, in order to provide an improved blind channel equalizer device. Amongst these improvements, several are aimed at simplifying the device, with a view to substantially reducing the processing power needed, in order notably to be able to install it on a "automotive-hardened" processor, which could be a fixed-point processor.

Figure 2:
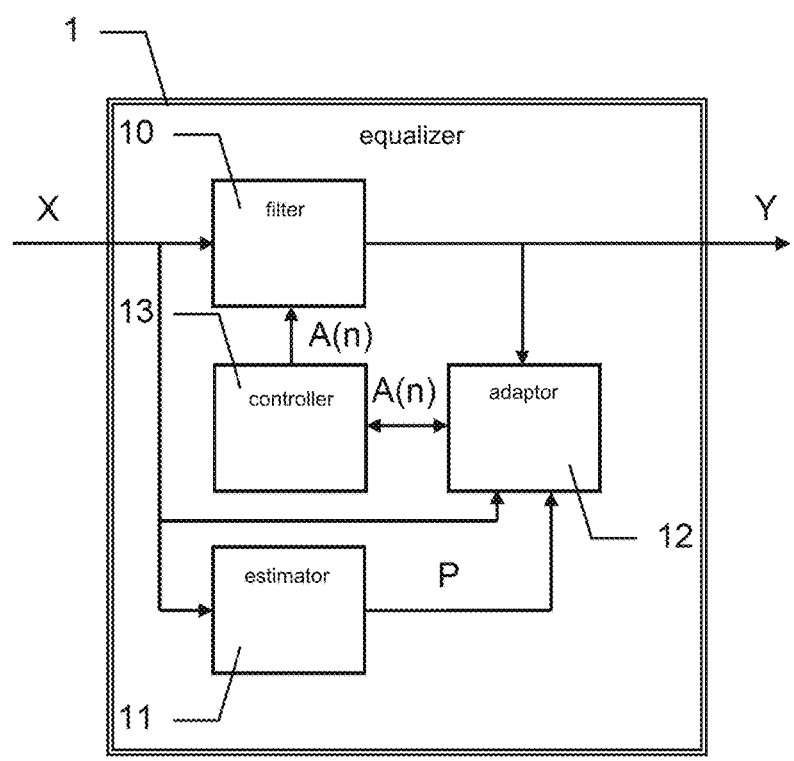
Figures 3, 4:
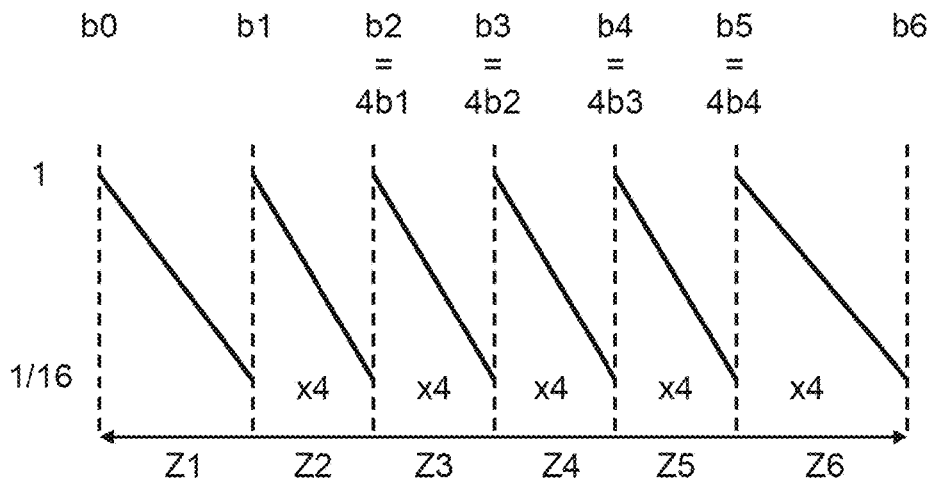
Figure 5:
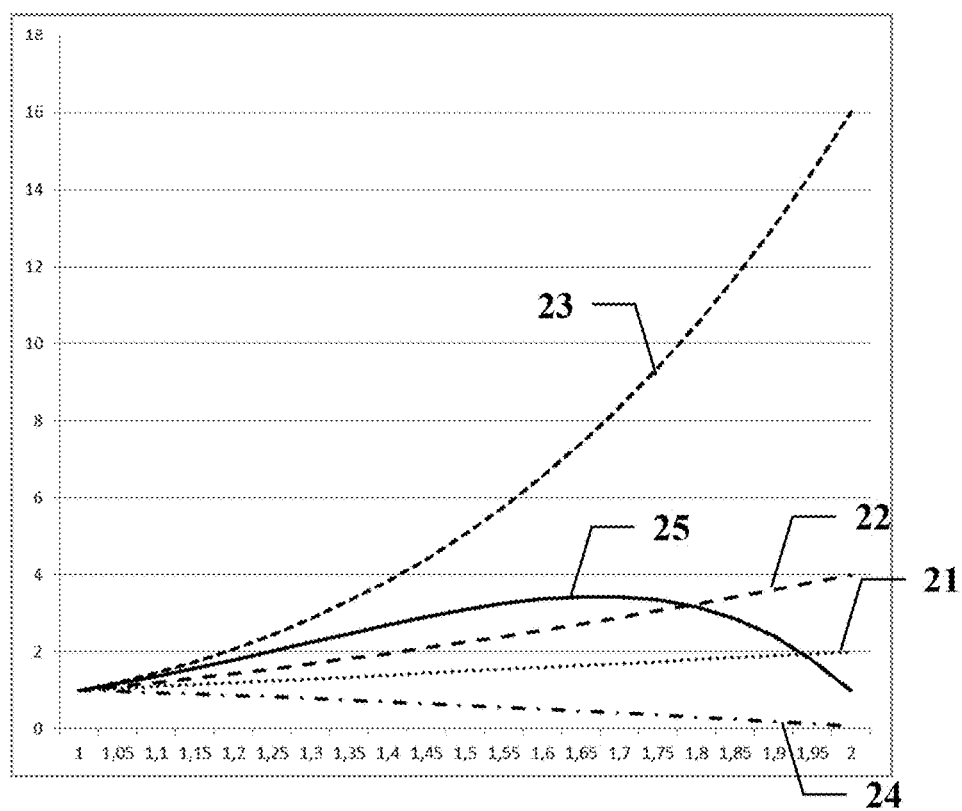

Other features, details and advantages of the invention will become more clearly apparent from the detailed description given hereinafter by way of example in relation with drawings in which:

FIG. 1 shows an overall schematic diagram of a radiofrequency receiver chain, comprising a blind equalizer device, FIG. 2 details such an equalizer device, FIG. 3 illustrates the dividing up of the power interval into regions in order to determine an approximation of the scaling coefficient, FIG. 4 is a table containing illustrative numerical values of the approximation, FIG. 5 illustrates the error in approximation of the scaling coefficient.

The invention is applicable to a radiofrequency receiver designed for a modulation with constant envelope signal at transmission. Such a modulation comprises frequency modulation and phase modulation.

As illustrated in FIG. 1, a radiofrequency receiver chain, of the type designed for a modulation with constant envelope signal at transmission, conventionally comprises, from left to right, an antenna 2, a selector 3, a demodulator 4 and a means for sound reproduction 6. The selector 3 is responsible for extracting, from the complete radio signal received by the antenna 2, a signal substantially centered on the central frequency of a channel. A selector 3 may be considered as a band pass centered on the central modulation frequency of the channel, performing an extraction of a part of the spectrum. The selector 3 does not modify the frequency, which remains the base frequency. The demodulator 4 is responsible for performing a demodulation of the signal selected in order to transform it into an audio signal intended to be reproduced. The sound reproduction means 6 is responsible for this reproduction. It is represented by a loudspeaker, but may comprise any system of reproduction comprising a headset, one or more loudspeakers and, where required, an amplification device.

The equalizer device 1 is interposed between the selector 3, from which it receives an input signal X, at the base frequency, and the demodulator 4, to which it supplies, after equalization processing, an output signal Y with characteristics similar to those of the input signal X.

A radiofrequency receiver chain may furthermore comprise at least one device 5 for processing the audio signal. Such a device 5 typically uses information coming from the signal (output signal Y or input signal X in the absence of an equalizer device 1) in order to improve the audio reproduction. This information coming from the signal, before or after demodulation, is measured by sensors 7, such as a field level measurement sensor or a modulation level measurement sensor.

Since the equalizer device 1 is optional, it is advantageous for the output signal Y to have a dynamic range comparable to that of the input signal X, so as not to interfere with these sensors 7 and the processing device 5 and for the potential addition of an equalizer device 1 to remain transparent for these modules.

FIG. 2 details the equalizer device 1 and its content. The principle of such an equalizer device 1 is to filter the input signal X in order to obtain the output signal Y. For this purpose, the equalizer device 1 comprises an adaptable filter 10. The filter 10 is adaptable for the output signal Y to reproduce, as faithfully as possible, the transmitted signal M.

The principle of the invention may be applied to any type of filter. However, the description that follows is more particularly illustrated in the case where the filter is formed by means of a digital filter 10.

One simplifying hypothesis assumes that the perturbation caused by the transmission of the signal is linear and that it may be corrected by means of a linear filter. Such a linear filter 10 is fully defined by its coefficients a(k), k∈{0, . . . , K}, where K is the dimension of the filter 10. These coefficients a(k) are grouped into a vector A which allows it to be globally designated. Since these coefficients are modified at each sampling time by the adaptor, the vector of the coefficients at a time n is denoted as A(n).

In order for the output signal Y to best copy the original signal M, the equalizer device 1 comprises an adaptor 12. This adaptor 12 is designed to adapt the filter 10 by calculating the coefficients A(n) of the filter 10 at the time n. According to the known stochastic gradient method, a convergence of the filter 10 may be obtained by calculating the coefficients A(n) of the filter 10 at the time n, in a recurrent manner, as a function of the coefficients A(n−1) of the filter 10 at the preceding time n−1 and of a cost function J. This calculation is carried out according to the formula A(n)=A(n−1)−λ∇J, where A(n) is the vector of the coefficients a(k), k∈{0, . . . , K}, of the filter 10, K being the dimension of the filter 10, at the time n, A(n−1) is the vector of the coefficients of the filter 10 at the preceding time n−1, λ is a correction coefficient, ∇ is the gradient operator and J is the cost function.

The cost function J to be minimized comprises a criterion indicative of the quantity $E(|Y(t)-M(t-\tau)|^2)$. Here, the criterion is a distance between the square of the output signal Y and the power P, indicative of a convergence radius r, with a relationship $P=r^2$, coming from the GODARD method.

Since the criterion depends on the power P, the device 1 furthermore comprises an estimator 11 designed to estimate the power P of the input signal X.

The correction coefficient λ is an important element in that it determines the speed of convergence of the closed-loop control for adaptation of the filter 10. If it is too small the convergence is not achieved or is too slow. On the other hand, if it is too big, the adaptation is unstable or divergent.

In a known manner, the correction coefficient λ is taken equal to a constant convergence coefficient μ, characteristic of the device 1 and conventionally adjusted empirically during tests.

However, and this comment is at the heart of the invention, even if by hypothesis the power of the transmitted signal M is constant, owing to the perturbations to which the channel is subjected, the power of the signal received at the input X may be variable, and may exhibit an extended interval of variation. The transmission does not take place with a gain of one. If the input signal X has a gain g, X→g·X, the gradient of the cost function J will have a gain $g^4$, ∇J→$g^4$·∇J. Accordingly, the correction coefficient λ will be multiplied by $g^4$. In order to avoid this detrimental effect threatening the convergence of the adaptation, according to one important feature, the correction coefficient λ is corrected by multiplying by a scaling coefficient $G_s$ inversely proportional to the power 4 of the convergence radius r or, which is equivalent, inversely proportional to the square of the power P. The following may then be written:

$$\lambda = \frac{\mu}{r^4} = \frac{\mu}{P^2}.$$

The GODARD method uses a criterion and a cost function J defined by the formula $$J = \sum_{k=n-M}^{n} (|y(k)|^2 - P)^2,$$

with J the cost function, y(n) the sample of the output signal Y at the time n, and P the power. The number M+1 of terms in this sum may be large (from a few tens to several hundreds) and leads to a large number of calculations. Accordingly, according to a preferred embodiment, this formula is simplified and replaced by its instantaneous version $J=(|y(n)|^2-P)^2$, limited to the current time n, with J the cost function, y(n) the sample of the output signal Y at the time n, and P the power.

With such a cost function J, the gradient of the cost function J is written $\nabla J=(|y(n)|^2-P)y(n)\overline{X(n)}$, with ∇ the gradient operator, J the cost function, y(n) the sample of the output signal Y at the time n, P the power, X(n) the vector of the samples x(k) of the input signal X, k∈{n−K, . . . , n} for the K+1 latest times, K being the dimension of the filter 10, and $\bar{z}$ denoting the conjugate of a complex number z.

It is verified in passing that, if the input signal X has a gain g, the output signal Y will have a factor g, and the power will have a factor $g^2$. Accordingly, the gradient of the cost function J becomes:

$$\nabla J=(|gy(n)|^2-g^2 P)gy(n)g\overline{X(n)}=g^4(|y(n)|^2-P)y(n)\overline{X(n)}$$

and hence ∇J→$g^4$ ∇J.

Another contributing feature is the introduction into the adaptation of a dispersion. For this purpose, the device 1 furthermore comprises a dispersion means, typically integrated into the adaptor 12. In the preceding formula for the gradient, this dispersion means replaces the second term y(n), sample of the output signal Y at the time n, by a term y(n+q), sample of the same output signal Y but at the time n+q, with q an integer, positive or negative. q is randomly chosen within an interval [−Q;+Q], with Q an integer. Thus, y(n), sample of the output signal Y at the time n, is randomly replaced by y(n+q), sample of the same output signal Y but taken at a time n+q, randomly varied in a manner centered about the time n and according to a range of variation Q. The formula for the gradient becomes $\nabla J=(|y(n)|^2-P)y(n)\overline{X(n)}$.

The range of variation Q is preferably equal to 10.

A first criterion has been previously described, coming from the GODARD constant module, in the form: $(|y(n)|^2-P)^2$. In order to further improve the convergence of the filter 10, another criterion is added. This criterion formalizes another property of a modulation with constant envelope signal at transmission, namely that the projection onto the real axis of the product of the signal and of its derivative is zero. This second criterion is expressed Re$(\overline{y(n)}(y(n)-y(n-1)))$. The cost function J, which necessarily incorporates the first criterion, then becomes $J=(|y(n)|^2-P)^2+Re(\overline{y(n)}(y(n)-y(n-1)))^2$, with J the cost function, y(n), respectively y(n−1), the sample of the output signal Y at the time n, respectively at the preceding time n−1, P the power, Re(z) denoting the real part of a complex number z, and $\bar{z}$ denoting the conjugate of a complex number z.

Known filters amongst linear digital filters are infinite pulse response filters, or IIR, and finite pulse response filters, or FIR. The filter 10 may be a filter of the RII or RIF type.

The non-recursive formulation of a RIF is however simpler. Accordingly, according to one embodiment, the filter 10 is modeled by a finite pulse response filter, or RIF. Such an RIF filter is such that $$y(n) = \sum_{k=0}^{K} a(k)x(n-k) = A(n)X(n),$$

with y(n) the sample of the output signal Y at the time n, x(k) the $k^{th}$ component, corresponding to the time k, of the vector X(n) representing the input signal X at the time n, k∈{n−K, . . . , n} for the K+1 latest times, K being the dimension of the filter 10, a(k) the $k^{th}$ coefficient of the filter 10, $k^{th}$ component of the vector A(n) regrouping these coefficients at the time n, k∈{0, . . . , K}, K being the dimension of the filter 10.

The dimension K of the filter 10 is a parameter whose choice results from a compromise. A reduction in the dimension K allows a reduction in the number of calculations to be performed. In contrast, an increase in the dimension K allows a longer interval of time to be considered. Accordingly, in relation with the sampling frequency, with regard to the problem of multiple reflections, an increase in the dimension K allows an increase in the maximum delay or, which is equivalent, the maximum reflection path, which may be taken into account and be equalized by the equalizer device 1.

According to another feature, the equalizer device 1 furthermore comprises a controller 13. The function of this controller 13 is to compare the coefficients A(n) of the filter 10 with two minimum and maximum thresholds. Thus, for each coefficient a(k), k∈{0, . . . , K}, the controller 13 verifies that it is included between a minimum threshold a min(k) and a maximum threshold a max(k), according to the expression a min(k)<a(k)<a max(k), k∈{0, . . . , K} with K the dimension of the filter 10. The 2(K+1) minimum and maximum thresholds are determined in such a manner as to prevent a divergence of the filter 10.

If all the coefficients a(k), k∈{0, . . . , K}, remain within the interval [a min(k); a max(k)], the controller 13 validates the coefficients a(k) and authorizes the filter 10 to apply them. In contrast, if at least one of the coefficients a(k) goes out of the interval [a min(k); a max(k)], the controller 13 causes the filter 10 to be reset.

In this latter case, similar to the initialization of the filter 10 during its start-up, all the coefficients a(k) are zeroed with the exception of the coefficient a(0) applied to x(n) which is taken equal to 1, in other words [a(0), . . . , a(k), . . . , a(K)]=[1, . . . , 0, . . . , 0].

The controller 13 is typically disposed, between the adaptor 12 and the filter 10, in such a manner as to control the coefficients A(n) after their calculation by the adaptor 12 and to only transmit to the filter 10 the calculated coefficients A(n) when they are valid.

According to one preferred embodiment, each minimum threshold a min(k) is opposite and equal in absolute value to the corresponding maximum threshold a max(k), according to the expression a min(k)=−a max(k), ∀k∈{0, . . . , K}.

It has previously been seen that one important feature consisted in correcting the correction coefficient λ by applying to it a scaling coefficient $G_S$ inversely proportional to the square of the power P. Such an inversion operation, although it can be carried out in one cycle on a floating-point processor, is generally not available on a fixed-point processor. In order to be able to approximate this calculation, in such a manner as to be doable by a fixed-point processor, the device 1 furthermore comprises an approximator designed to determine an approximation of the scaling coefficient $G_S$.

The principle of this approximator is illustrated in relation with FIG. 3. It consists in dividing up the range or interval of variation of the power P, represented here by the abscissa axis, into a number S of regions Zi, i=1 . . . S, with S=6 in FIG. 3. This is a division or partition in that the regions Zi are all disjoint, and that the union of all the regions Zi covers the entirety of the power interval P. The dividing up of the regions Zi is carried out in such a manner that the power P of a region Zi varies by a factor 4 relative to the preceding region Z(i−1), or, which is equivalent, that the signal X, or alternatively the convergence radius r, varies by a factor 2. It then follows that from one region Zi to the immediately consecutive region Z(i+1), the scaling coefficient $G_S$, proportional to $$\frac{1}{P^2},$$

is divided by 16, or $2^4$. Thus, if bi, i=0 . . . S, denotes the boundaries between the regions Zi, each region Zi is positioned between the boundaries b(i−1) and bi, or alternatively, the region Zi is defined by the interval [b(i−1); bi]. The boundaries bi verify the relationship bi=4×b(i−1), i=1 . . . S.

Within each of the regions Zi, the scaling coefficient $G_S$ is modeled by an approximating function FAi. By factorizing a cumulated multiplying factor $2^4$, the function FAi associated with each region Zi is advantageously a simple function, such as a polynomial function of low degree d, thus defined by a limited number d+1 of coefficients. The determination of these coefficients is obtained by writing all the relationships and the limiting conditions, notably that the scaling coefficient $G_S$ divided up into approximating functions FAi by levels is continuous. An approximating function FAi is thus associated with each region Zi. The continuity condition is expressed by an equality between the value of the approximating function FAi of the region Zi at bi and the value of the function FA(i+1) of the following region Z(i+1) at their common boundary bi.

Thus, over each region Zi, the calculation of the scaling coefficient $G_S$, proportional to $$\frac{1}{P^2},$$

is approximated by the application of the corresponding function FAi(P), which gives rise to simpler calculations and, above all, which may be performed by a fixed-point processor.

It has been seen that the degree of the polynomial of the approximating functions FAi is advantageously reduced. In practice, it is taken equal to 2 at the most, with polynomials of the approximating functions FAi as quadratics, defined by three coefficients, or else preferably equal to 1, with polynomials of the approximating functions FAi as linear dependencies on the power P, thus defined by two coefficients α and β.

Thus, in this latter case, an approximating function FAi is defined by a formula FAi(P)=(αP+β)$2^δ$, with a factor $2^δ$ introducing, at each region Zi, from left to right, a division by 16, i.e. a division by $2^4$, cumulated at each region Zi, i.e. $\delta=4(i-S)$, with i the index of the region Zi and S the total number of regions, i.e. $FAi(P)=(\alpha P+\beta)2^{4(i-S)}$.

The scaling coefficient $G_S$ is then obtained by applying, for each region Zi, the function FAi associated with the region Zi of the power P, i.e. $G_S=FAi(P)=(\alpha P+\beta)2^{4(i-S)}$.

This approximation advantageously allows a calculation of $$\frac{1}{P^2}$$

to be replaced by a linear function, simple to evaluate by a fixed-point processor, and by a multiplication by a power of 2, carried out by a simple binary shift.

Even more advantageously, a factorizing by a power of 2, chosen for each region Zi, is applied, according to the formula $$\alpha P+\beta = 2^\eta\left(\frac{\alpha}{2^\eta}P+\frac{\beta}{2^\eta}\right)=\frac{\alpha'}{2^\eta}P+\frac{\beta'}{2^\eta},$$

such a manner that the new coefficients, $\alpha'$ and $\beta'$, are both integers. In order to better detail the approximation, a numerical example is described hereinbelow, in relation with the table in FIG. 4. It is assumed that the power P varies within an interval $[4,77 \cdot 10^7; 0.03125]$. The idea is to divide up this interval as previously described, which results in S=8 regions Z1 . . . Z8, bounded by 9 boundaries b0 . . . b8. The table in FIG. 4 gives, for each region Zi, its lower boundary $b(i-1)$ in the $2^{nd}$ column and its upper boundary bi in the $3^{rd}$ column.

For each region Zi, the two coefficients $\alpha$ and $\beta$ of the linear function and $\delta$ the power of 2 are determined, which define the function FAi. $\alpha$ is equal to $$-\frac{15}{16(b_i-b_{i-1})}$$

and is listed in the $4^{th}$ column. $\beta$ is equal to 21/16 and is listed in the $5^{th}$ column. $\delta$ is equal to $4(i-S)$ and is listed in the $6^{th}$ column.

The table furthermore comprises the integer coefficients $\alpha'$ and $\beta'$, respectively listed in the $8^{th}$ and $9^{th}$ columns, obtained by multiplying by $2^\eta$, $\eta$ being listed in the $7^{th}$ column. The powers of 2, $\eta$ and $\delta$ are simplified into a single binary shift.

FIG. 5 illustrates the error introduced by the approximation of the scaling coefficient $G_S$. Over an interval $[1; 2]$ covering the range of variation of a variable x, indicative of a region Zi, whose upper boundary is twice the lower boundary, five curves 21-25 are shown. The curve 21 represents the straight line identity function y=x, here equivalent to the convergence radius r or alternatively with the input signal X. The curve 22 represents the parabola $y=x^2$, equivalent to the power P, and whose upper boundary, equal to 4, is in a ratio 4 with the lower boundary, equal to 1. The curve 23 represents the curve $y=x^4$, equivalent to the square of the power P. The curve 24 represents the scaling factor $G_S$ approximated by a linear function of the power P or of $x^2$, between the lower boundary 1 where it takes the value 1 and the upper boundary 4 where it takes the value 1/16, i.e. the curve $y=-5/16x^2+21/16$ equivalent to $-5/16P+21/16$. The curve 25 represents the product of the approximated scaling factor $G_S$ and of $x^4$, i.e. the curve $y=G_S x^4$, equivalent to $y=G_S P^2$.

Since the approximated scaling factor $G_S$ is an approximation of $$\frac{1}{P^2},$$

the quality of the approximation is all the better the closer the product $G_S P^2$ is to 1. It can thus be seen that the approximation is perfect, by construction, at the boundaries bi of the regions Zi, and exhibits a variation by a factor having a maximum of around 3.5.

In the absence of a correction by the scaling factor $G_S$, the correction coefficient $\lambda$ would have an error of the order of the power excursion, i.e. b8/b0, greater than 65000 in the numerical application. So, an error of a maximum of 3.5 introduced by the approximation is perfectly acceptable.

The power P is used by the equalizer device 1 to calculate the scaling coefficient $G_S$ (according to the exact method or according to the approximation) and to calculate the first criterion. Accordingly, an estimator 11 is used to estimate the power P of the input signal X. According to one embodiment, this power P is determined by an average over a sliding time window and is assigned a fixed gain $\gamma$. This gain $\gamma$ is configurable in order to be able to be initialized at the factory. The power P is determined by the formula $$P=\gamma\sum_{k=n-N}^{n}|x(k)|^2,$$

with P the power, $\gamma$ the configurable fixed gain, x(k) the sample of the input signal X at the time k, $k\in\{n-N, \ldots, n\}$, N being the size of the sliding time window.

The invention furthermore relates to a radiofrequency receiver comprising such a channel equalizer device 1 according to any one of the embodiments described.

The invention claimed is:

1. A blind channel equalizer device (1) for a radio frequency receiver designed for a modulation with constant envelope signal at transmission, comprising:
   an adaptable linear digital filter (10), defined at a time (n) by its coefficients (A(n)), designed to filter an input signal (X) so as to produce an output signal (Y),
   an estimator (11) designed to estimate a power (P) of the input signal (X),
   an adaptor (12) designed to adapt the filter (10) by calculating the coefficients (A(n)) of the filter (10) at a time (n), by subtracting from the coefficients (A(n-1)) of the filter (10), at a preceding time (n-1), the gradient of a cost function (J) with a correction coefficient ($\lambda$),
where the cost function (J) comprises a first distance criterion between the square of the output signal (Y) and the power (P), where the correction coefficient ($\lambda$) is a product comprising a constant convergence coefficient ($\mu$), wherein the correction coefficient ($\lambda$) furthermore comprises a scaling coefficient ($G_s$) inversely proportional to the square of the power (P).

2. The device (1) as claimed in claim 1, where the cost function (J) is defined by the formula $J=(|y(n)|^2-P)^2$ with J the cost function, y(n) the sample of the output signal (Y) at the time n, and P the power.

3. The device (1) as claimed in claim 2, furthermore comprising a dispersion means, replacing the gradient of the cost function (J), defined by the formula $\nabla J=(|y(n)|^2-P)y(n)\overline{X(n)}$, with $\nabla$ the gradient operator, J the cost function, y(n) the sample of the output signal (Y) at the time n, P the power, X(n) the vector of the samples x(k) of the input signal (X), $k \in \{n-N, \ldots, n\}$, K being the dimension of the filter (10), and $\bar{z}$ denoting the conjugate of a complex number z, by the formula $\nabla J=(|y(n)|^2-P)y(n+q)\overline{X(n)}$, with q a random integer, such that $-Q \leq q < +Q$, wherein Q is an integer.

4. The device of claim 3, wherein Q=10.

5. The device (1) as claimed in claim 3, where the cost function (J) furthermore comprises a second criterion for equivalence to zero of the projection onto the real axis of the product of the output signal (Y) and of its derivative, the cost function then being defined by the formula $$J=(|y(n)|^2-P)+(Re(\overline{y(n)}(y(n)-y(n-1))))^2,$$

with J the cost function, y(n), respectively y(n−1), the sample of the output signal (Y) at the time n, respectively at the preceding time n−1, P the power, Re(z) denoting the real part of a complex number z and $\bar{z}$ denoting the conjugate of a complex number z.

6. The device (1) as claimed in claim 3, where the filter (10) is a filter with finite pulse response.

7. The device (1) as claimed in claim 3, furthermore comprising a controller (13) designed to verify, following a calculation of the coefficients (A(n)) of the filter (10), that each coefficient falls between a minimum threshold and a maximum threshold, the said controller (13) being furthermore designed to reset the coefficients (A(n)) of the filter (10) in the opposite case.

8. The device (1) as claimed in claim 2, where the cost function (J) furthermore comprises a second criterion for equivalence to zero of the projection onto the real axis of the product of the output signal (Y) and of its derivative, the cost function then being defined by the formula $$J=(|y(n)|^2-P)+(Re(\overline{y(n)}(y(n)-y(n-1))))^2,$$

with J the cost function, y(n), respectively y(n−1), the sample of the output signal (Y) at the time n, respectively at the preceding time n−1, P the power, Re(z) denoting the real part of a complex number z and $\bar{z}$ denoting the conjugate of a complex number z.

9. The device (1) as claimed in claim 2, where the filter (10) is a filter with finite pulse response.

10. The device (1) as claimed in claim 2, furthermore comprising a controller (13) designed to verify, following a calculation of the coefficients (A(n)) of the filter (10), that each coefficient falls between a minimum threshold and a maximum threshold, the said controller (13) being furthermore designed to reset the coefficients (A(n)) of the filter (10) in the opposite case.

11. The device (1) as claimed in claim 1, where the cost function (J) furthermore comprises a second criterion for equivalence to zero of the projection onto the real axis of the product of the output signal (Y) and of its derivative, the cost function then being defined by the formula $$J=(|y(n)|^2-P)+(Re(\overline{y(n)}(y(n)-y(n-1))))^2,$$

J the cost function, y(n), respectively y(n−1), the sample of the output signal (Y) at the time n, respectively at the preceding time n−1, P the power, Re(z) denoting the real part of a complex number z and $\bar{z}$ denoting the conjugate of a complex number z.

12. The device (1) as claimed in claim 11, where the filter (10) is a filter with finite pulse response.

13. The device (1) as claimed in claim 11, furthermore comprising a controller (13) designed to verify, following a calculation of the coefficients (A(n)) of the filter (10), that each coefficient falls between a minimum threshold and a maximum threshold, the said controller (13) being furthermore designed to reset the coefficients (A(n)) of the filter (10) in the opposite case.

14. The device (1) as claimed in claim 1, where the filter (10) is a filter with finite pulse response.

15. The device (1) as claimed in claim 1, furthermore comprising a controller (13) designed to verify, following a calculation of the coefficients (A(n)) of the filter (10), that each coefficient falls between a minimum threshold and a maximum threshold, the said controller (13) being furthermore designed to reset the coefficients (A(n)) of the filter (10) in the opposite case.

16. The device of claim 15, wherein each minimum threshold is equal to the opposite of the corresponding maximum threshold.

17. The device (1) as claimed in claim 1, furthermore comprising an approximator designed to determine an approximation of the scaling coefficient ($G_s$), comprising a division means designed to divide the range of power (P) of the input signal (X) into a plurality of regions (Zi), such that the power (P) varies substantially by a factor 4 between two contiguous regions (Zi), an association means designed to associate with each region (Zi) an approximating function (FAi) for calculation of the scaling coefficient ($G_s$) over the said region (Zi) as a function of the power (P), in the form of a polynomial divided by a power of 2 quadruple of an index corresponding to the region (Zi), in continuity with the approximating function (FAi) associated with a contiguous region (Zi), and an application means designed to apply the approximating function (FAi) associated with a corresponding region (Zi) to the power (P) for calculating an approximation of the scaling coefficient ($G_s$).

18. The device (1) as claimed in claim 17, where one polynomial of an approximating function (FAi) is a linear function of the power (P).

19. The device (1) as claimed in claim 1, where the estimator (11) determines the power (P) of the input signal (X), by an average over a sliding time window, being assigned a configurable fixed gain ($\gamma$).

20. A radiofrequency receiver further comprising a channel equalizer device (1) according to claim 1.

* * * * *